US012752311B2

(12) United States Patent
Lee

(10) Patent No.: US 12,752,311 B2
(45) Date of Patent: Oct. 6, 2026

(54) SCRAPER

(71) Applicant: TIEN-I INDUSTRIAL CO., LTD., Taichung City (TW)

(72) Inventor: Larry Lee, Taichung City (TW)

(73) Assignee: TIEN-I INDUSTRIAL CO., LTD., Taichung City (TW)

(*) Notice: Subject to any disclaimer, the term of this patent is extended or adjusted under 35 U.S.C. 154(b) by 326 days.

(21) Appl. No.: 18/399,936

(22) Filed: Dec. 29, 2023

(65) Prior Publication Data

US 2024/0238846 A1 Jul. 18, 2024

(30) Foreign Application Priority Data

Jan. 13, 2023 (TW) ................................ 112101474

(51) Int. Cl.
*B08B 1/16* (2024.01)
*A47L 13/022* (2006.01)
*A47L 13/08* (2006.01)

(52) U.S. Cl.
CPC ............ *B08B 1/165* (2024.01); *A47L 13/022* (2013.01); *A47L 13/08* (2013.01)

(58) Field of Classification Search
CPC . B08B 1/16; B08B 1/165; A47L 13/02; A47L 13/022; A47L 13/08; B23D 79/08; B27G 17/04; B44D 3/162; B44D 3/164; B60S 3/045
USPC ....................................................... 15/236.01
See application file for complete search history.

(56) References Cited

U.S. PATENT DOCUMENTS 1,458,171 A * 6/1923 Donaldson ............... B25D 3/00 279/97
5,056,225 A * 10/1991 Jubran ................... B23D 79/08 30/169
7,343,639 B2 * 3/2008 Dranginis ............... A47L 13/02 15/236.08
8,683,641 B2 * 4/2014 Weinberger .......... A46D 1/0207 30/169
9,051,744 B1 * 6/2015 Murray ................... E04F 21/04
10,730,193 B2 * 8/2020 Nishihara .............. B23K 26/34
11,253,987 B2 * 2/2022 Levand .................... B25G 3/36
11,821,221 B2 * 11/2023 Murray .................... B25G 3/34
(Continued)

FOREIGN PATENT DOCUMENTS

TW I674348 B 10/2019
TW M597539 U 6/2020
TW I743694 B 10/2021

*Primary Examiner* — Nathaniel E Wiehe
*Assistant Examiner* — Justin A Pruitt
(74) *Attorney, Agent, or Firm* — MUNCY, GEISSLER, OLDS & LOWE, P.C.

(57) ABSTRACT

A scraper is provided, wherein the scraper includes: a blade head having a first hardness and including a cutting portion and a first main body, the cutting portion being connected to the first main body, the cutting portion including two cutting surfaces defining an included angle, the first main body having a first thickness and a first width in longitudinal and thickness directions perpendicular to each other and perpendicular to a width direction; and a blade body having a second hardness and including a second main body connected to the first main body, the second main body having a second thickness and a second width; wherein the included angle ranges from 40 to 75 degrees, and the first hardness is larger than the second hardness.

8 Claims, 3 Drawing Sheets

(56) References Cited

U.S. PATENT DOCUMENTS

| | | | | |
|---|---|---|---|---|
| 2009/0223064 | A1* | 9/2009 | Venderley | A47L 13/08 30/169 |
| 2009/0320299 | A1* | 12/2009 | Kuhn | B08B 1/165 30/169 |

* cited by examiner

SCRAPER

BACKGROUND OF THE INVENTION

Field of the Invention

The present invention relates to a scraper, and more particularly to a scraper including a blade head and a blade body which are different in hardness.

Description of the Prior Art

The scraper is a professional tool used for scraping, and it can perform precision processing on the surface of a workpiece, scrape off the remaining material or glue on the surface, and surface-smoothing operations. These scrapers are like ones disclosed in TW I743694, TW M597539 and TW I674348.

However, in the blades of the conventional scrapers, people only focus on sharpness and ignore the strength and safety of use. Therefore, the blades of the above-mentioned scrapers are very easy to break and cannot be used for scraping harder objects so that its use is so limited.

The present invention is, therefore, arisen to obviate or at least mitigate the above-mentioned disadvantages.

SUMMARY OF THE INVENTION

The main object of the present invention is to provide a scraper which has better structural strength and scraping angle for scraping operations.

To achieve the above and other objects, a scraper is provided, wherein the scraper includes: a blade head having a first hardness and including a cutting portion and a first main body, the cutting portion being connected to an end of the first main body in a longitudinal direction, the cutting portion including two cutting surfaces, the two cutting surfaces defining an included angle therebetween, the first main body having a first thickness in a thickness direction, the first main body having a first width in a width direction, the longitudinal direction, the thickness direction and the width direction being perpendicular to one another; and a blade body having a second hardness and including a second main body, the second main body being connected to another end of the first main body in the longitudinal direction, the second main body having a second thickness in the thickness direction, the second main body having a second width in the width direction; wherein the included angle ranges from 40 to 75 degrees, and the first hardness is larger than the second hardness.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
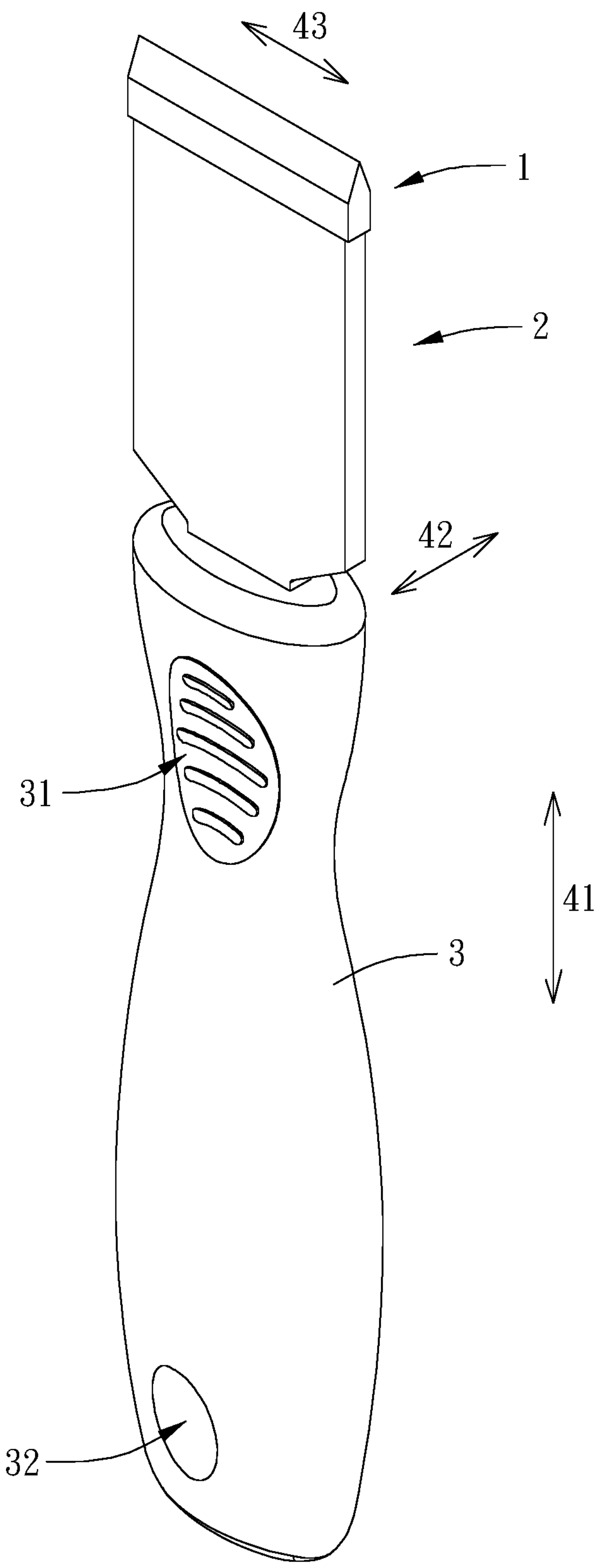
FIG. 1 is a stereogram of an exemplary embodiment of the present invention.
Figure 2:
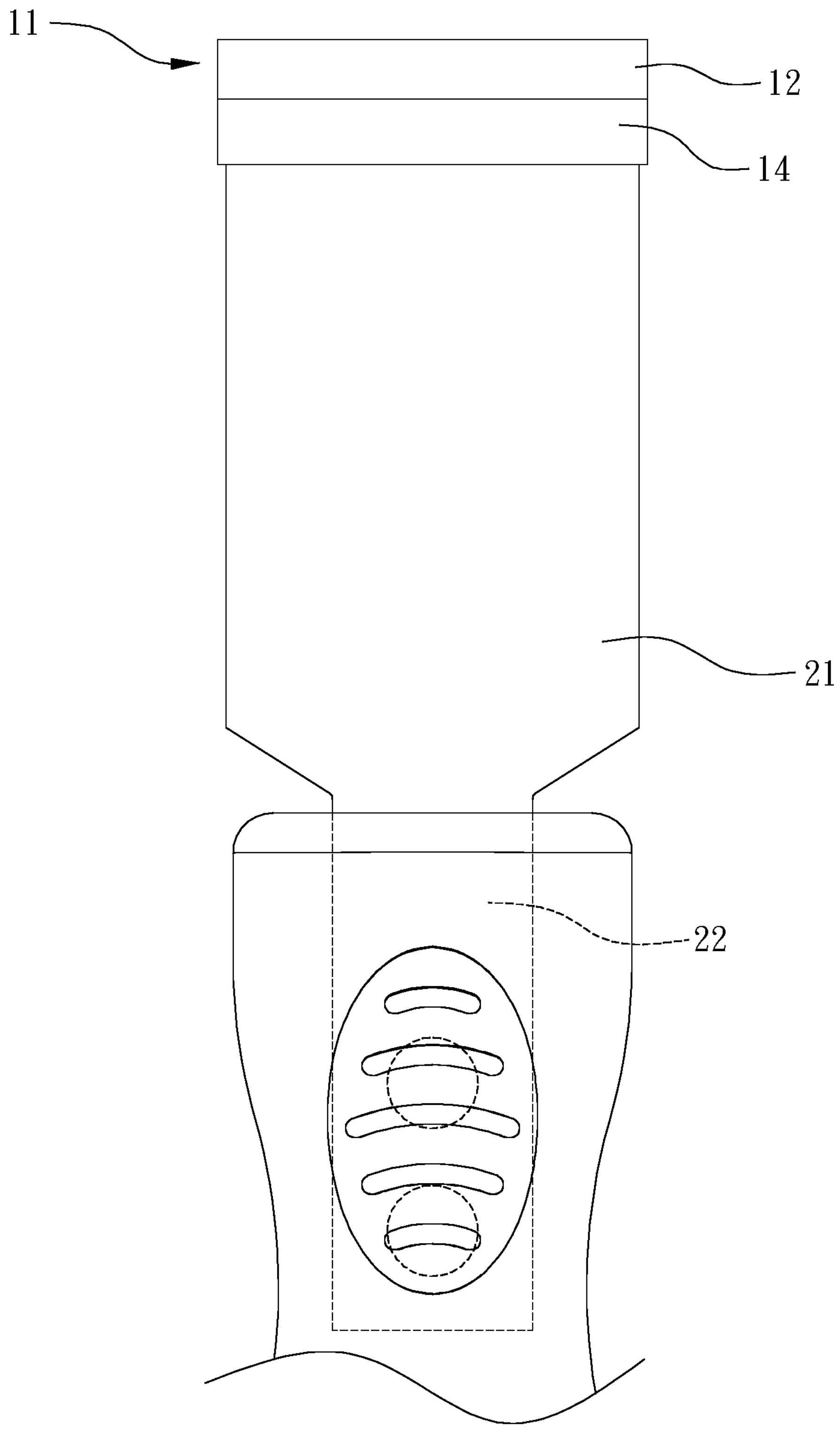
FIG. 2 is a partial enlargement of an exemplary embodiment of the present invention.
Figure 3:
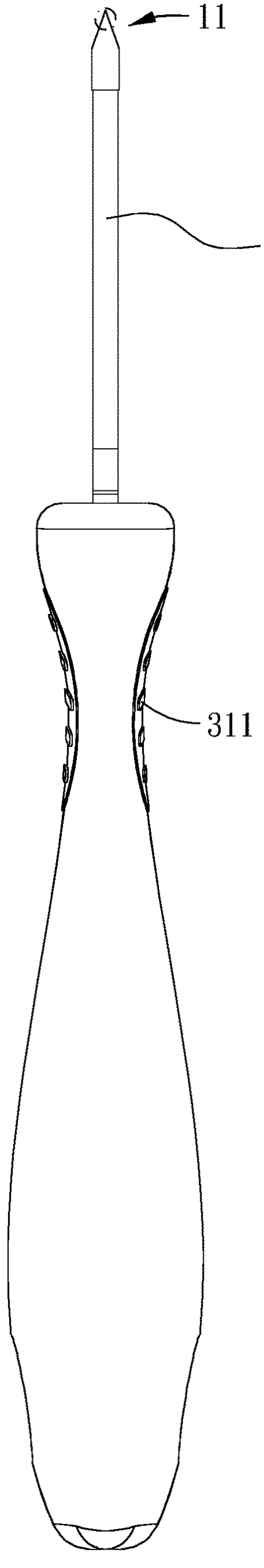
FIG. 3 is a side view of an exemplary embodiment of the present invention.
Figure 4:
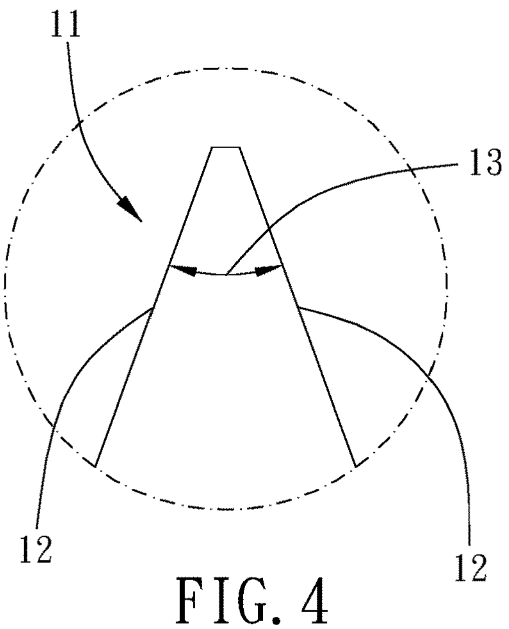
FIG. 4 is a partial enlargement of FIG. 3.

Please refer to FIGS. 1 to 4 for an exemplary embodiment of the present invention. A scraper of the present invention includes a blade head 1 and a blade body 2.

The blade head 1 has a first hardness, the blade head 1 includes a cutting portion 11 and a first main body 14, the cutting portion 11 is connected to an end of the first main body 14 in a longitudinal direction 41, the cutting portion 11 includes two cutting surfaces 12, and the two cutting surfaces 12 define an included angle 13 therebetween. Preferably, the included angle 13 ranges from 40 to 75 degrees, for example but not limited to, the included angle 13 is 60 degrees, which is conducive to insertion, engaging and scrapping.

The first main body 14 has a first thickness in a thickness direction 42, the first main body 14 has a first width in a width direction 43, and the longitudinal direction 41, the thickness direction 42 and the width direction 43 are perpendicular to one another. The blade body 2 has a second hardness, the blade body 2 includes a second main body 21, the second main body 21 is connected to another end of the first main body 14 in the longitudinal direction 41, the second main body 21 has a second thickness in the thickness direction 42, and the second main body 21 has a second width in the width direction 43. The first hardness is larger than the second hardness. For example, the first hardness ranges from HRA85 to HRA94, ensuring that the structure of the blade head 1 can withstand large stress and is not easy to break during the scraping process. The first thickness is different from the second thickness, and the first width is different from the second width.

Preferably, the first thickness is larger than the second thickness so that it can avoid friction and collision between the blade body 2 and surrounding objects, preventing the blade body 2 from being damaged during scrapping. Additionally, the first width is larger than the second width so that the blade head 1 is wider so that the scraped material will expand outward when the scraper scrapes forward without touching the blade body 2 or the user's fingers. In this embodiment, a ratio of the first width to the second width ranges from 1.02 to 1.10.

Preferably, an end of the cutting portion 11 remote from the first main body 14 is blunted, the blunted end is not sharp and can create more contact area to the object to be scraped, which is conducive to the scraping and avoids problems such as stress concentration and fracture.

In this embodiment, the first main body 14 and the second main body 21 are welded to be connected to each other by using silver, the first main body 14 is cuboid, the two cutting surfaces 12 are obliquely connected to the first main body 14, the second main body 21 is cuboid, the first main body 14 extends from the second main body 21. In the longitudinal direction 41, a ratio of a length of the second main body 21 to a length of the blade head 1 ranges from 4.00 to 7.00.

The blade head 1 has a first gloss, the blade body 2 has a second gloss, and the first gloss is different from the second gloss. For example, an outer surface of the blade head 1 is a polished surface, and an outer surface of the blade body 2 is a matte surface, which make it easier for users to distinguish the blade head 1 and the blade body 2. If light is needed for fine and precise movements of scrapping, the brighter blade head 1 allows the user to easily find the working position, and the matte blade body 2 can reduce unnecessary reflective interference.

The scraper further includes a grip 3, the blade body 2 further includes a handle 22, the handle 22 is connected to a side of the second main body 21 remote from the blade head 1, the handle 22 is inserted in and positioned to the grip 3, and the second main body 21 is protrusive beyond the grip 3. An end of the grip 3 adjacent to an end of the second main body 21 includes an anti-slip structure 31, and the grip has a third hardness smaller than the second hardness, facilitating the finger to apply force and providing a comfortable holding experience. In this embodiment, the anti-slip structure 31 includes a plurality of ribs 311, and the plurality of ribs 311 are located relatively above the handle 22, the grip 3 is made of plastic material by injection molding and covers the handle 22, and the grip 3 includes a through hole 32, which can be hung and displayed when not in use.

The invention further provides a method for manufacturing the scraper. The method includes: providing the blade head 1 including the cutting portion 11; providing the blade body 2; welding the blade head 1 to the blade body 2; blunting a sharp end of the cutting portion 11 so that a distal end of the cutting portion 11 is polygonal-shaped.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A scraper including:

a blade head having a first hardness and including a cutting portion and a first main body, the cutting portion being connected to an end of the first main body in a longitudinal direction in which a length of the scraper extends, the cutting portion including two cutting surfaces, the two cutting surfaces defining an included angle therebetween, another end of the first main body having a first thickness in a thickness direction, the first main body having a first width in a width direction, the longitudinal direction, the thickness direction and the width direction being perpendicular to one another; and a blade body having a second hardness and including a second main body, an end of the second main body being connected to the another end of the first main body in the longitudinal direction, the end of the second main body having a second thickness in the thickness direction, the second main body having a second width in the width direction;

wherein the included angle ranges from 40 to 75 degrees, and the first hardness is larger than the second hardness;

wherein the first main body and the second main body are welded to be connected to each other by using silver;

wherein the first thickness is larger than the second thickness so that the another end of the first main body and the end of the second main body are connected to be in a stepped configuration.

2. The scraper of claim 1, wherein the first hardness ranges from HRA85 to HRA94, and the first width is different from the second width.

3. The scraper of claim 1, wherein the included angle is 60 degrees.

4. The scraper of claim 1, wherein an end of the cutting portion remote from the first main body is blunted.

5. The scraper of claim 1, further including a grip, wherein the blade body further includes a handle, the handle is connected to a side of the second main body remote from the blade head, the handle is inserted in and positioned to the grip, the second main body is protrusive beyond the grip; an end of the grip adjacent to an end of the second main body includes an anti-slip structure, and the grip having a third hardness smaller than the second hardness.

6. The scraper of claim 1, wherein the blade head has a first gloss, the blade body has a second gloss, and the first gloss is different from the second gloss.

7. The scraper of claim 6, wherein an outer surface of the blade head is a polished surface, and an outer surface of the blade body is a matte surface.

8. The scraper of claim 2, wherein the included angle is 60 degrees; an end of the cutting portion remote from the first main body is blunted; the scraper further includes a grip, the blade body further includes a handle, the handle is connected to a side of the second main body remote from the blade head, the handle is inserted in and positioned to the grip, the second main body is protrusive beyond the grip; an end of the grip adjacent to an end of the second main body includes an anti-slip structure, and the grip has a third hardness smaller than the second hardness; the blade head has a first gloss, the blade body has a second gloss, and the first gloss is different from the second gloss; an outer surface of the blade head is a polished surface, and an outer surface of the blade body is a matte surface; the first width is larger than the second width; the grip is made of plastic material by injection molding and covers the handle, and the grip includes a through hole; the first main body is cuboid, the two cutting surfaces are obliquely connected to the first main body, the second main body is cuboid; the anti-slip structure includes a plurality of ribs, and the plurality of ribs are located relatively above the handle; in the longitudinal direction, and a ratio of a length of the second main body to a length of the blade head ranges from 4.00 to 7.00; a ratio of the first width to the second width ranges from 1.02 to 1.10.

* * * * *